United States Patent [19]

Wilkes

[11] Patent Number: 5,308,386
[45] Date of Patent: May 3, 1994

[54] AIR RELIEF VALVE FOR A PRESSURE VESSEL

[75] Inventor: Robert D. Wilkes, Sanford, N.C.

[73] Assignee: Essef Corporation, Chardon, Ohio

[21] Appl. No.: 13,101

[22] Filed: Feb. 3, 1993

[51] Int. Cl.⁵ .......................................... B01D 19/00
[52] U.S. Cl. ...................................... 96/158; 96/165; 96/167; 96/195; 137/202; 210/188
[58] Field of Search ............ 55/52, 165, 170, 199–203; 137/202; 210/120, 188

[56] References Cited

U.S. PATENT DOCUMENTS

| | | |
|---|---|---|
| 3,786,829 | 1/1974 | Nardo et al. |
| 4,197,097 | 4/1980 | Magorien et al. ................ 55/165 |
| 4,799,940 | 1/1989 | Millikan .............................. 55/52 |
| 4,900,335 | 2/1990 | Algers ............................. 55/52 X |
| 4,917,795 | 4/1990 | Sable et al. .................... 210/120 |
| 5,019,141 | 5/1991 | Granville et al. ................. 55/170 |
| 5,028,244 | 7/1991 | Szlaga ............................... 55/170 |
| 5,035,729 | 7/1991 | Hodgkins ..................... 55/170 X |

*Primary Examiner*—Charles Hart
*Attorney, Agent, or Firm*—Pearne, Gordon, McCoy & Granger

[57] ABSTRACT

The present invention is directed towards an air relief valve for a pressure vessel which automatically releases air from the system during filling with liquid, and which automatically seals when the liquid in the system reaches a predetermined level to prevent the liquid from leaving the system. The air relief valve of the present invention includes a valve body which provides communication between the pressure vessel and a series of output ports. These output ports are provide with a pressure indicator, a manual pressure release valve, and an automatic air relief valve. The manual pressure release valve is operable by the user to introduce air into the system, which is necessary during draining. The automatic air relief valve is generally a one-way valve, allowing air to exit but not enter the system. Communication of air to the automatic air relief valve is controlled by a float which prevents fluid communication between the pressure vessel and the automatic air relief valve when the water within the system reaches a predetermined level. A second embodiment modifies the automatic air relief valve for use in low pressure situations.

20 Claims, 5 Drawing Sheets

AIR RELIEF VALVE FOR A PRESSURE VESSEL

BACKGROUND OF THE INVENTION

1. Field of the Invention

The present invention generally relates to pressure vessels and, more particularly, to air relief valves for such vessels.

2. Description of the Related Art

During the development of pressure vessels, it has become common to include valves which release air during filling of the vessel with liquid. Over the years, these valves have been developed to automatically bleed air from the pressure vessel until the water therein reaches a predetermined level, at which point the valve automatically prevents the further escape of air.

U.S. Pat. No. 3,786,829, which issued on Jan. 22, 1974, discloses a common type of pressure vessel air relief valve. The '829 patent includes a downwardly directed tube which extends between the interior of the pressure vessel and an inner chamber of the valve body. The chamber, which is located intermediate the tube and a vent, is provided with a float ball which operates to seal the vent when the water in the pressure vessel reaches a predetermined level. During filling of the pressure vessel, air is allowed to escape from the vessel by way of the tube, chamber, and vent. A flow diverting plate positioned under the ball permits escaping air to rise around the ball without causing the ball to prematurely seal the vent. When the water reaches a predetermined level, air from the vessel is no longer admitted to the tube. Thereafter, the addition of further water into the pressure vessel causes water to flow into the chamber via the tube, forcing the float ball to rise and sealingly engage the upper end of the chamber. There is no provision for a manual air valve to bleed or introduce air into the inner chamber of the valve body to facilitate draining of the system.

The automatic air relief valves known in the art generally operate under the principle that a certain amount of air should remain in the pressure vessel during operation of the system to encourage pressure build-up therein. However, such air is undesirable in many applications, such as swimming pool filter systems. In such systems, it is most desirable that substantially all of the air is removed from the system prior to operation thereof. Also, the air valves known in the art generally do not include a manual air valve to introduce air into the system to aid in draining thereof. Furthermore, the known systems are generally unsatisfactory when the system is operated at low pressure due to leakage of air or water around the float valve.

SUMMARY OF THE INVENTION

The present invention is directed towards an air relief valve which allows substantially all of the air to be vented from the pressure vessel prior to pressurization of the pressure system and which provides means to introduce air into the system to facilitate draining of the pressure vessel.

In accordance with the present invention, the air relief valve includes an integral valve body which is received by a pressure vessel port. The valve body defines a central cylindrical chamber into which components of the air relief valve are placed.

In further accordance with the present invention, the central chamber houses a float, a vortex plate, and a poppet valve. The float is operable to control fluid communication between the pressure vessel and atmosphere in accordance with the fluid level in the pressure vessel. The vortex plate is directly in the fluid flow path between the float and the poppet valve, and transforms the fluid stream from a generally axial flow path into a spiral flow path, causing the gases to separate from the liquids and solids in the fluid stream. The poppet valve is operable to allow gas to exit the pressure vessel while preventing gas from entering therethrough.

In further accordance with the present invention, the central float includes a central body member and an upwardly extending cylindrical member. The upper cylindrical member includes means which are sealingly engageable with an annular seat provided by the valve to prevent further fluid communication between the pressure vessel and atmosphere. Prior to sealing, the upper portion of the hollow cylinder extends into a circular opening defined by the annular seat. Insertion of the hollow cylinder into the circular opening limits the volume of air flowing through the latter and reduces the shock or "water hammer" caused by suddenly blocking fluid flow through the opening.

In accordance with a further embodiment of the present invention, a low pressure kit is provided to allow the air relief valve to be used in a low pressure environment. The low pressure kit includes a compression means which forces the poppet valve to resist or prevent the escape of fluids therearound in the absence of a high pressure condition within the pressure vessel.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
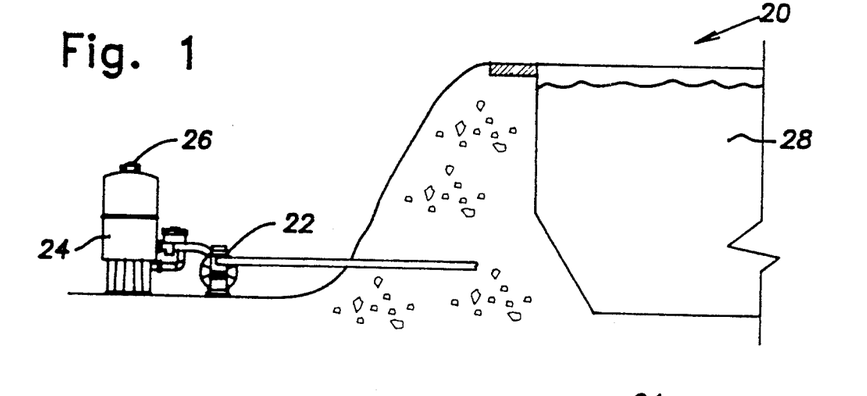
FIG. 1 is an elevational view, partially in cross section, of a pool filter system in accordance with the present invention.

With reference to FIG. 1, a pool filter system 20 incorporating the present invention is shown. The pool filter system 20 includes a pump 22, a pressure vessel 24, and an air relief valve 26. As is rather well known in the art, the pump 22 takes water from a pool 28, forces it through a filter material (not shown) in the pressure vessel 24, and thereafter returns the water to the pool 28. Preferably, the filter material is diatomaceous earth or the like.

Turning to FIGS. 2-11, the air relief valve 26 is particularly shown. The air relief valve generally includes an integral valve body 30, a float 32, a body insert 34, a vortex plate 36, a top plate 38, and a poppet valve 40. A manual air bleeder valve 42 and a pressure indicator 44 are also attached to the integral valve body 30.

Figure 2:
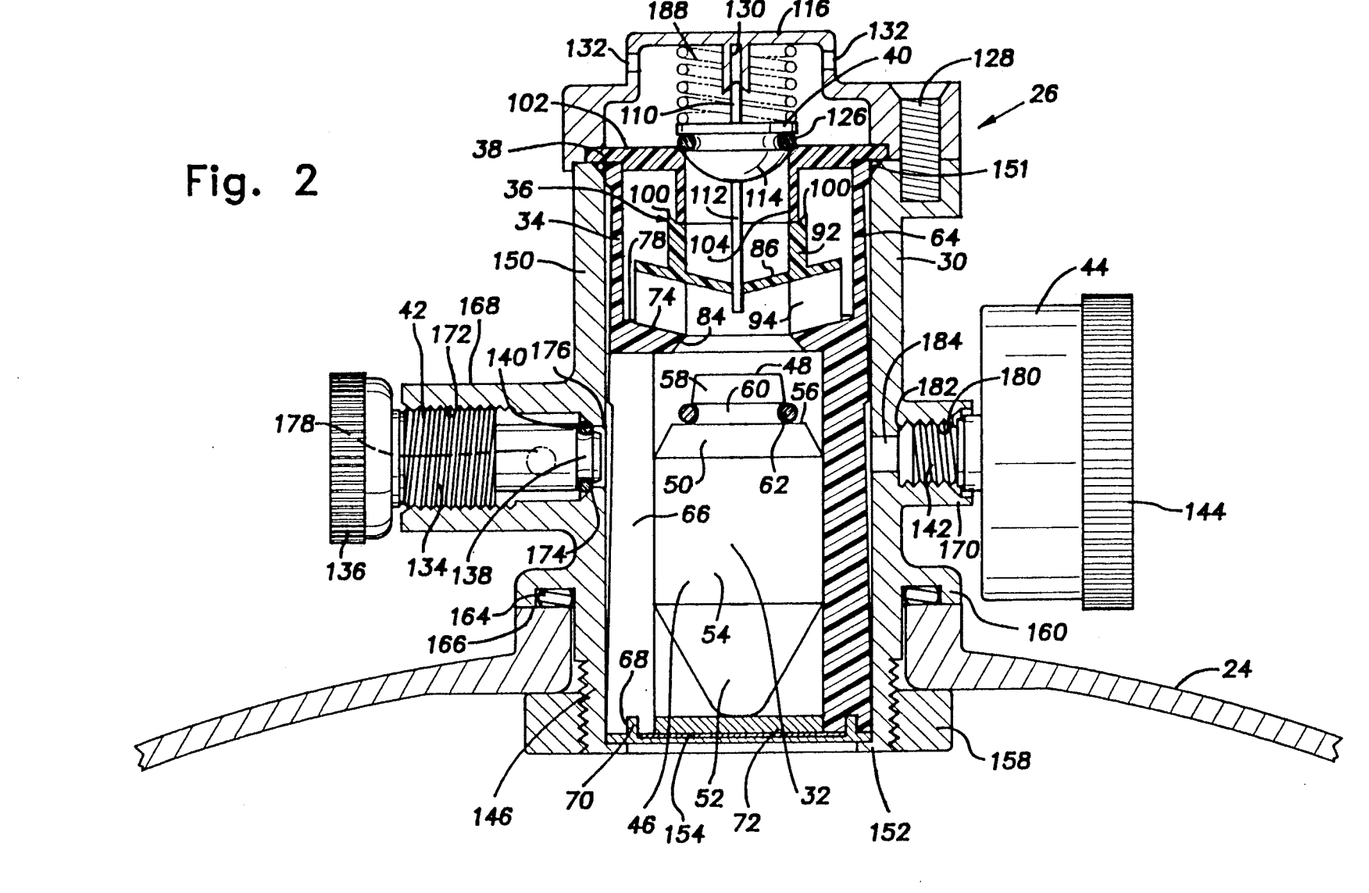
FIG. 2 is an elevational view, in cross section, of an air valve in accordance with the present invention.
Figure 3:
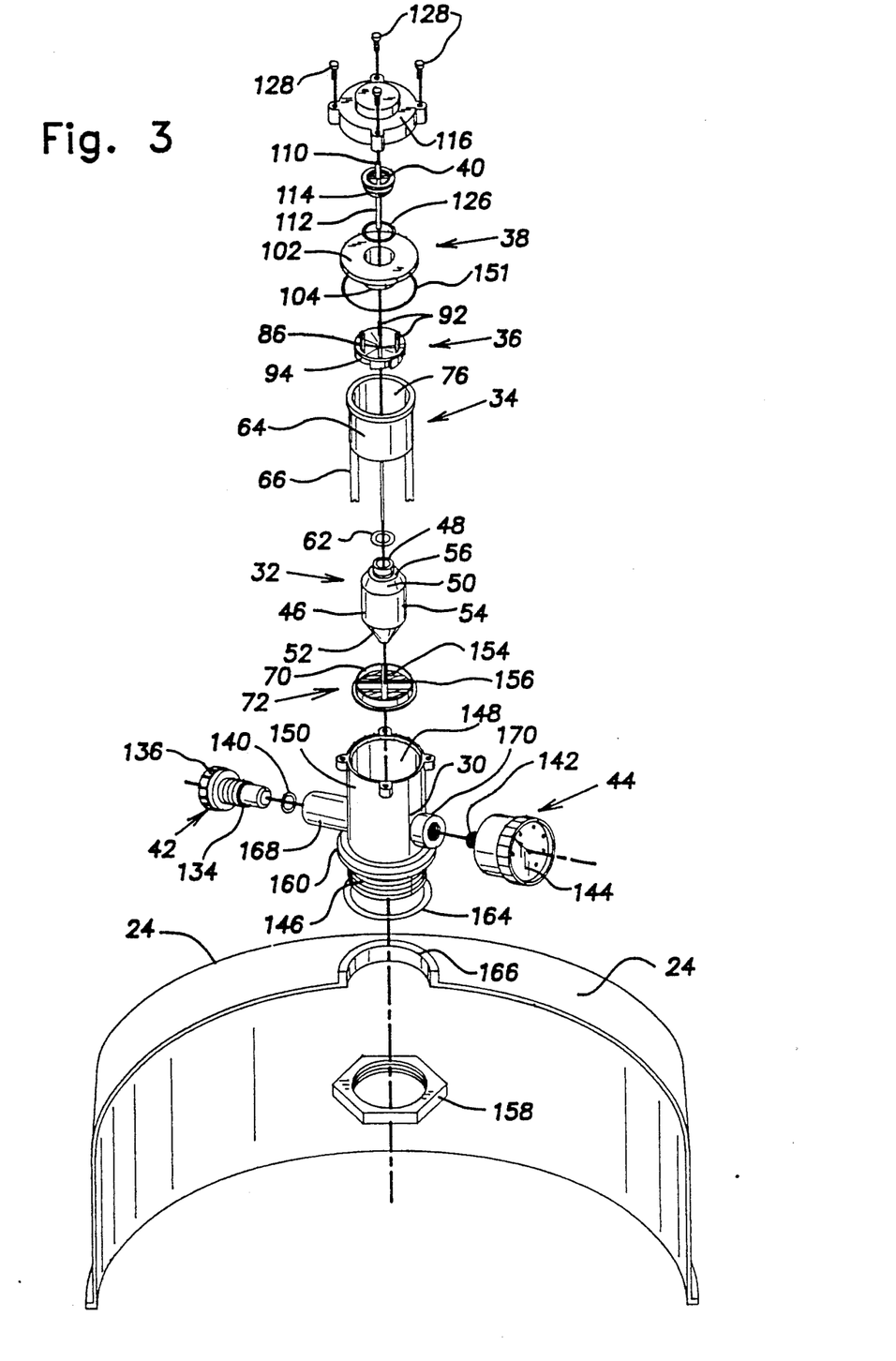
FIG. 3 is an exploded perspective view of the air valve of the present invention.

As shown best in FIGS. 2 and 3, the float 32 includes a central body member 46 and an upper sealing portion 48. The central body member 46 includes upper and lower, frustoconical sections 50 and 52 which are aerodynamically designed to encourage the passage of fluid therearound during filling of the pressure vessel 24. The upper and lower sections 50, and 52 merge with a cylindrical member 54 therebetween, as illustrated. The upper section 50 includes an upper surface 56 from which the upper sealing portion 48 projects.

The upper sealing portion 48 is generally shaped as a hollow, upwardly extending cylinder 58 which provides a circumferential groove 60 adjacent the upper surface 56 of the upper section 50. An O-ring 62 is mounted in the circumferential groove 60, and sealingly engages a seat provided by the body insert 34 when the water within the pressure vessel 24 reaches a predetermined maximum level, as will be described hereafter.

Figure 4:
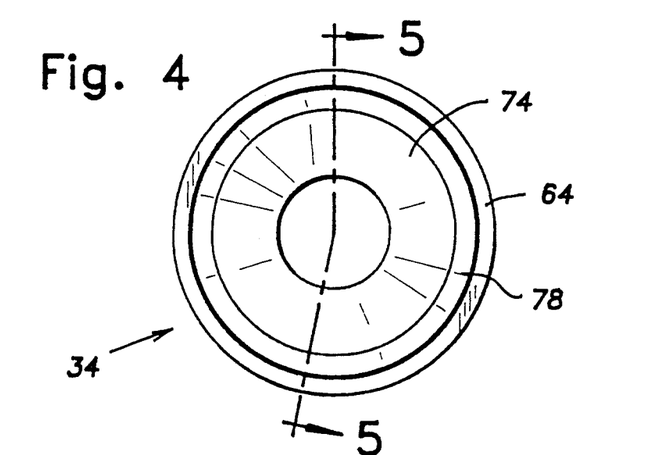
FIG. 4 is a view of a body insert in accordance with the present invention.
Figure 5:
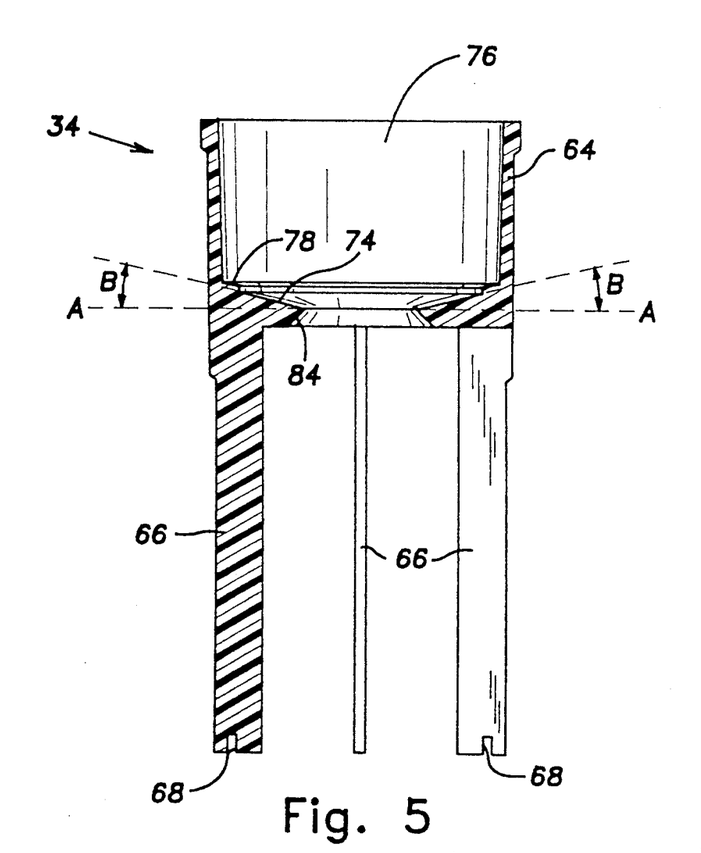
FIG. 5 is a cross sectional view of the body insert, as seen along lines 5—5 of FIG. 4.

The body insert 34, as shown best in FIGS. 4-5, includes an upper cylindrical wall 64 and a series of downwardly extending arms 66. Terminal ends of the arms include a groove 68 into which is press-fit an upstanding rib 70 of a float retainer 72 (FIG. 2). The arms 66 also axially guide the float 32 within the central chamber.

The body insert 34 further provides an annular surface 74 which cooperates with the upper cylindrical wall 64 to define an upper chamber 76 for receipt of the vortex plate 36. The annular surface 74, which includes an outer raised portion 78 adjacent the cylindrical wall 64, preferably slopes downwardly from the upper cylindrical wall 64 towards its center at an angle B with respect to the A—A axis, as shown best in FIG. 5. Most preferably, the angle B is about 14°. The vortex plate 36 rests upon the annular surface 74 of the body insert 34.

The annular surface 74 includes an inner beveled edge 84 surrounding the center opening therein, as illustrated. The beveled edge 84 serves as a seat against which the O-ring 62 carried by the float 32 sealingly engages to fluidly isolate the pressure vessel 24 from atmosphere when liquid within the vessel reaches the predetermined maximum level. When the water level in the pressure vessel 24 rises to the point that all of the air has been expelled therefrom, water flows into the air relief valve 26 and the float 32 rises, causing the hollow cylinder 58 to extend upwardly through the circular opening defined by the annular surface 74 of body insert 34, limiting fluid flow therethrough and thereby reducing the shock upon the system caused by suddenly blocking the continued release of fluid through the poppet valve 40.

Figure 6:
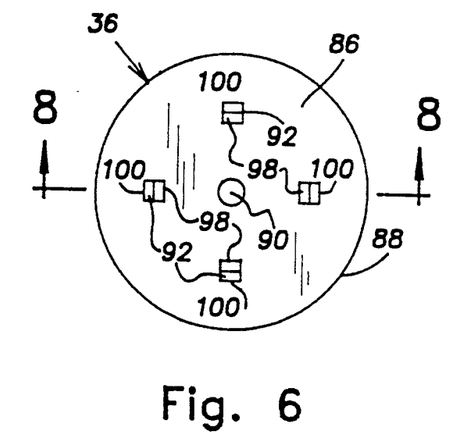
FIG. 6 is a top plan view of a vortex plate in accordance with the present invention.
Figure 7:
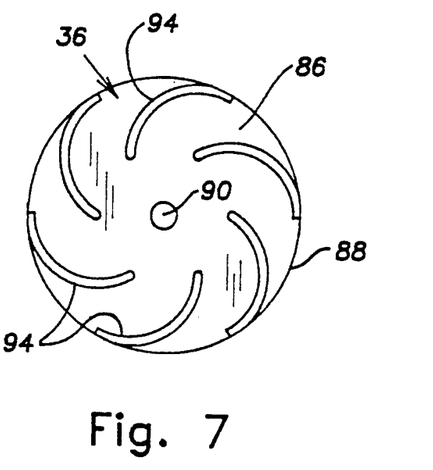
FIG. 7 is a bottom plan view of the vortex plate in accordance with the present invention.
Figure 8:
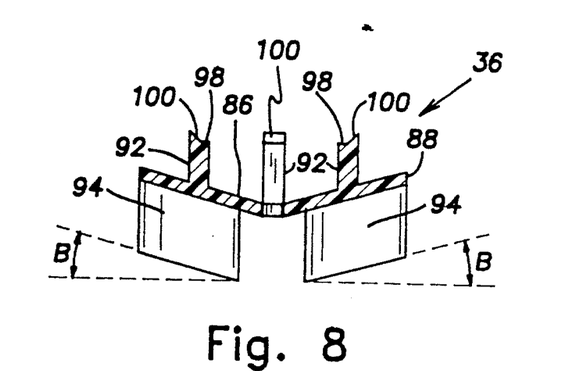
FIG. 8 is an elevational view, in cross section, of the vortex plate of FIGS. 6 and 7.

The vortex plate 36, which is shown best in FIGS. 6-8, includes a main body member 86 which slopes downwardly from an outer edge 88 towards a central opening 90. The main body member 86 includes a series of upwardly-directed projections 92, and a series of downwardly-directed arcuate vanes 94. Preferably, the main body member 86 and the vanes 94 slope at an angle which is generally equal to the angle B, allowing the vanes 94 to continuously engage the annular surface 74 of the body insert 34 along their lengths. The vanes are dimensioned to fit within the circular space defined by the outer raised portion 78 of the annular surface 74, as shown in FIG. 2.

The downwardly-directed spiral vanes 94, as illustrated in FIG. 7, are designed to redirect the fluid stream emanating from the pressure vessel 24. Specifically, the fluid stream is transformed from an axial flow path into a spiral flow path. The centrifugal forces created by this spiral flow path cause the liquids and solids to separate from the gases in the fluid stream, as will be described more fully hereafter.

The upwardly-directed projections 92 provided by the vortex plate 36 each have an upper terminal end which defines a planar section 98 and an upwardly-ramping section 100. The planar sections 98 are designed to engage a portion of the top plate 38 while the upwardly-ramping sections 100 cooperate to index and maintain the vortex plate 36 in position relative to the top plate 38.

Figure 9:
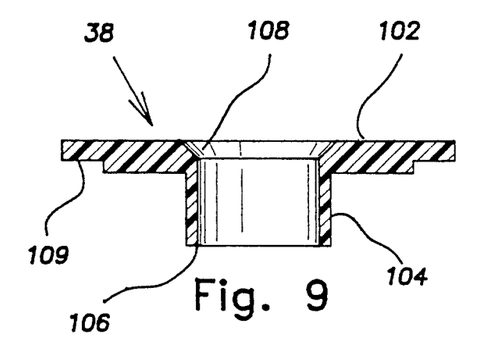
FIG. 9 is an elevational view, in cross section, of a top plate of the present invention.

The top plate 38, as shown in FIGS. 3 and 9, includes a ring-shaped plate 102 and a downwardly-directed cylindrical member 104. The cylindrical member 104 includes a terminal end 106 which is engaged by the upwardly-directed projections 92 provided by the main body member 86 of the vortex plate 36. The terminal end 106 of the cylindrical member 104 rests upon the planar sections 98 of the projections 92 while the upwardly-ramping sections 100 engage an outer edge of the terminal end 106 of the cylindrical member 104, as illustrated in FIG. 2. An inner edge 108 of the ring-shaped plate 102 is beveled for the sealing receipt of the poppet valve 40. A lower surface of the ring-shaped plate 102 includes an annular notch 109 to allow the sealing engagement of the top plate 38 to the valve body 30 and body insert 34, as shown best in FIG. 2.

Figure 10:
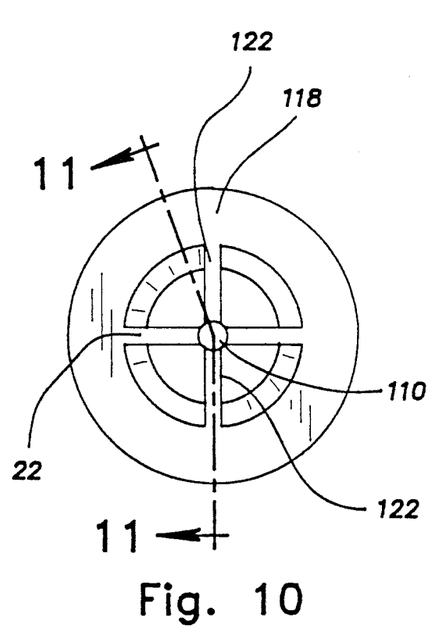
FIG. 10 is a top plan view of a poppet valve in accordance with the present invention; and, FIG. 11 is a cross-sectional view of the poppet valve as seen from lines 11—11 in FIG. 10.
Figure 11:
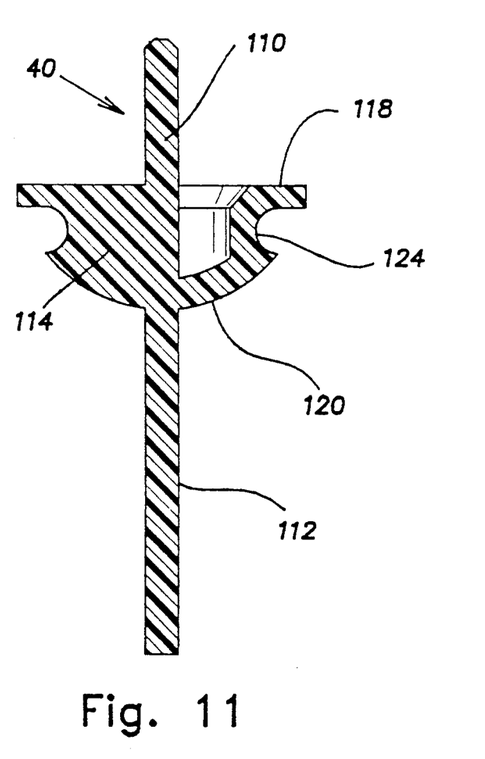

The poppet valve 40, as illustrated in FIGS. 2, 10, and 11, includes upper and lower valve stems 110 and 112 and a central body member 114. The upper valve stem 110 is slidably received by a valve cap member 116, while the lower valve stem 112 extends through the top plate 38 and into the central opening 90 in the vortex plate 36.

The central body member 114 includes a generally annular upper surface 118 and a rounded lower surface 120. Preferably, the poppet valve 40 is formed out of ABS plastic and is generally hollow, a pair of arms 122 connecting the annular upper surface 118 and sides of the rounded surface 120. The rounded lower surface 120 has formed therein a groove 124 which receives an O-ring 126 (FIG. 2) to facilitate the sealing engagement of the poppet valve 40 with the top plate 38. As illustrated, the upper valve stem 110 projects out of the intersection of the arms 122.

The valve cap member 116 is attached to the integral valve body 30 by a plurality of fasteners 128 and includes an interior slot 130 for the sliding receipt of the upper valve stem 110 of the poppet valve 40. As shown best in FIG. 2, the valve cap 116 sealingly holds the top plate 38 against the valve body 30. A plurality of openings 132 are formed in the cap member 116 to allow air to exit the valve 26.

The manual air bleeder valve 42 includes a partially externally-threaded plug section 134 having a handle or knob 136 at an outer terminal end and a circumferential groove 138 near an inner terminal end. An O-ring 140 is received by the circumferential groove 138. When installed within the integral valve body 30, the handle 136 is accessible to the user to control the engagement of the O-ring 140 with a seat provided by the valve body 30 to alternatively allow or prevent fluid communication therethrough, as will be described hereafter.

The pressure indicator 44 is a generally conventional device having an externally-threaded, hollow stem 142 and an analog pressure gauge 144. Naturally, any known type of pressure indicator or gauge can be substituted for the one specifically illustrated without departing from the scope and spirit of the present invention.

The integral valve body 30 includes an exteriorly threaded lower end 146 and an interior central chamber 148. The central chamber is defined by a cylindrical sidewall 150 and sized to frictionally receive the body insert 34, as illustrated. As should be clear from FIG. 2, the body insert and float retainer are sized to fit within the interior central chamber 148.

An upper end of the cylindrical sidewall 150 receives an O-ring 151 which is sealingly compressed between the top plate 38, body insert 34, and sidewall 150 by the valve cap member 116 under the influence of the fasteners 128. The threaded lower end 146 of the cylindrical sidewall 150 includes an inner annular rim 152 which supports the body insert 34 and the circular float retainer 72. Hence, the top plate 38, vortex plate 36, body insert 34, and float retainer 72 are trapped between the valve cap member 116 and the inner annular rim 152 while the float 32 and poppet valve are movably mounted therebetween.

The float retainer 72 includes a mesh filter 154 and arms 156 which retain the float 32 within the central chamber 148 while allowing fluids to travel between the central chamber 148 and the pressure vessel 24. The mesh filter 154 generally prevents debris and filtering media from entering and contaminating the central chamber 148 of the integral valve body 30. A bulkhead nut 158 is threadably received within the pressure vessel 24 by the threaded lower end 146 of the integral valve body 30 to positively attach the valve body 30 to the pressure vessel 24.

Upwardly spaced from the threaded lower end 146, the exterior surface of the valve body 30 includes a radially extending skirt 160 that provides a downwardly opening annular groove for the receipt of an O-ring 164. The skirt 160 and O-ring 164 cooperate to seal against an outer surface 166 of the pressure vessel 24, as illustrated.

The valve body 30 also integrally includes first and second outwardly-extending tubular projections 168 and 170 for receiving the manual air bleeder valve 42 and the pressure indicator 44, respectively. The first tubular projection has a threaded inner surface 172 and a first inner annular end 174 adjacent the central chamber 148. The central chamber 148 communicates with the interior of the first tubular projection via a first bore 176 which extends through the cylindrical sidewall 150 surrounding the chamber. The first bore 176 is generally coaxial with the first inner annular end 174 as illustrated.

The first inner annular end 174 provides an inwardly beveled surface which serves as a seat against which the O-ring 140 provided by the manual air bleeder valve 42 seals, as discussed previously. The first tubular projection 168 further includes a side bleed vent 178 (FIG. 2) which, depending upon the position of the manual bleed valve 42, provides access to atmosphere during filling and draining of the system 20.

The second tubular projection 170 has a hollow interior defined by a threaded sidewall 180 and a second inner annular end 182. The center chamber 148 communicates with the interior of the second tubular projection 170 via a second bore 184 which extends through the cylindrical sidewall 150 surrounding the chamber 148 and is generally coaxial with the second inner annular end 182, as illustrated.

As should be clear from the drawing figures, the first and second outwardly extending tubular projections 168, 170, bores 176, 184 and annular ends 174, 182 are coaxial. Naturally, these structural features can be arranged or presented in several different manners without departing from the scope of the present invention, the illustrated embodiment merely being the preferred arrangement presently contemplated by the inventor.

The air relief valve 26 of the present invention is generally assembled in the following manner. Initially, prior to mounting of the air relief valve 26 on the pressure vessel 14, the manual air bleeder valve 42 is threadably inserted into the first outwardly extending tubular projection 168 and the pressure indicator 44 is threadably inserted into the second outwardly extending tubular projection 170. Preferably, the pressure indicator 44 is permanently mounted within the second tubular projection 170 by means of conventional adhesives or the like.

Thereafter, the threaded lower end 146 of the valve body 30 is inserted into a port 186 provided by the pressure vessel 24 and mounted thereto by means of the bulkhead nut 158. Turning of the bulkhead nut 158 onto the threaded end 146 of the valve body 30 causes the O-ring 164 and skirt 160 to engage the outer surface 166 of the pressure vessel 24, thereby sealing the junction between the valve body and the pressure vessel.

The float 32 is inserted between the arms 66 of the body insert 34 and the rib 70 provided by the float retainer 72 is press-fit into the groove 68 in the arms 66 and the combination is slidably inserted into the central chamber 148 of the valve body, resting upon the annular rim 152 provided by the sidewall 150. Thereafter, the vortex plate 36 is inserted into the upper chamber 76 of the body insert 34 so that the vanes 94 rest upon the annular surface 74.

The O-ring 151 is positioned adjacent the upper edge of the sidewall 150 and the upper edge of the cylindrical wall 64 of the body insert 34, and the top plate 38 is mounted on top of the vortex plate 36 such that the terminal edge 106 of the cylindrical member 104 rests upon the planar section 98 of the upwardly directed projections 92. Simultaneously, the lower notched surface 109 of the top plate 38 engages the upper portions of the body member 30, body insert 34, and O-ring 151. The poppet valve 40 is located on the top plate 38 such that the lower valve stem 112 extends through the central opening 90 in the vortex plate 36. The cap member 116 is placed over the valve body 30 and attached thereto by means of a series of fasteners 128, sealingly compressing the O-ring 151 and fluidly isolating the interior of the pressure vessel 24 from atmosphere. The upper valve stem 110 slidably extends into the interior slot 130 provided by the valve Cap member 116.

Operation of the air relief valve 26 will be described hereafter with reference to the foregoing description and drawings.

With the air relief valve 26 mounted and assembled as described above, the pump is activated to fill the pressure vessel 24. As the water level in the pressure vessel 24 increases, a fluid stream flows around the float 32 and is guided spirally outward by the vanes 94 of the vortex plate 36. The fluid stream includes gases as well as liquids and small solid particles, such as filtering media which got through the filter screen 154.

As the fluid stream is forced to take on a spiral or circular flow path due to the vanes 94, the liquids and solids therein are separated from the gases and are retained within the upper chamber 76 of the body insert 34 while the gases flow upwardly through the cylindrical member 104 of the top plate 38 to atmosphere via the poppet valve 40. When the water level in the pressure vessel 24 rises to the point that all of the gas has been expelled therefrom, the float 32 rises, causing the O-ring 62 thereon to engage the seat provided by the body insert 34 and prevent the further escape of fluid from the pressure vessel 24. In this manner, the system is pressurized to allow the pump 22 to pump water from the pool 28, through the filtering medium in the pressure vessel 24, and return the filtered water to the pool 28.

When the pressure vessel is to be disassembled for cleaning or maintenance, the pump 22 is shut off and the manual air bleeder valve 42 opened to introduce air into the pressure vessel 24 and allow draining thereof.

As should be clear from the foregoing description, access to the components of the valve 26 housed within the chamber 148 is easily gained by removing the valve cap member 116 and reversing the steps of assembly. Therefore, in the air relief valve 26 of the present invention, maintenance and cleaning can be accomplished without disassembly of the pressure vessel 24, all necessary components being accessible from an exterior of the pressure vessel 24.

The automatic air relief valve 26, discussed above, is designed for the common operational environment wherein the relief valve is predetermined distance (i.e. more than about 30 inches) below the pool water level. Since the force with which the O-ring 62 provided by the float 32 seats against the beveled surface 84 of the body insert 34 is determined by the buoyancy of the float 32 and the static head of water above the air relief valve 26, when the air relief valve is less than the predetermined distance (i.e. less than about 30 inches) below the pool water level, there is not enough force to properly seat the O-ring 62 against the inwardly beveled surface 84 and water may leak out around the O-ring 62 and under the poppet valve 40.

Therefore, in such circumstances, a low pressure kit must be installed. Such a low pressure kit, as will be described hereafter, stiffens the poppet valve 40 and generally prevents the escape of fluid therearound except when an unusually high pressure is developed within the pressure vessel 24.

As shown in phantom in FIG. 2, the low pressure kit includes a compression means or coil spring 188. The coil spring 188 is designed to mount between the poppet valve 40 and the valve cap member 116.

Initially, assuming that the air relief valve 26 is assembled in accordance with the foregoing description, the valve cap member 116 is removed or unfastened from the valve body 30. The coil spring 188 is placed on the underside of the valve cap member 116 such that it is generally coaxial with the interior slot 130 provided by the valve cap 116. The valve cap 116 and coil spring 188 are placed over the top of the assembly, such that the coil spring rests upon the upper surface 118 of the poppet valve 40. Thereafter, the valve cap 116 is attached to the valve body 30 via the fasteners 128.

As so mounted, the coil spring 188 biases the poppet valve 40 to the closed position, preventing the escape of fluid from around the poppet valve 40 in the absence of a high pressure condition and allowing the air relief valve 26 of the present invention to be used in a low pressure environment.

Otherwise, the operation and assembly of the air relief valve 26 with the low pressure kit is identical to the normal, i.e. non-low pressure kit, air relief valve 26.

While the preferred embodiment of the present invention is shown and described herein, it is to be understood that the same is not so limited but shall cover and include any and all modifications thereof which fall within the purview of the invention, as set forth in the claims appended hereto.

What is claimed is:

1. A relief valve for a pressure vessel, said pressure vessel being adapted to retain a quantity of liquid therein, said relief valve comprising a valve body which is adapted to mount within a port in the pressure vessel, automatic valve means mounted to said valve body and adapted to vent fluid from said valve body while preventing gas from the atmosphere from entering said valve body therethrough, flow control means housed within the valve body and adapted to control communication of a fluid stream in accordance with liquid level in the pressure vessel, and a fluid stream diversion and separation means, said diversion and separation means being operable to separate the fluid stream into a non-gaseous portion and a gaseous portion, said non-gaseous portion being retained within said valve body and said gaseous portion being vented to atmosphere via said automatic valve means.

2. A relief valve according to claim 1, wherein said diversion and separation means comprises a vortex plate having a series of arcuate vanes which divert the fluid stream from a generally axial flow path into a generally spiral flow path, centrifugal forces created by said spiral flow path separating the fluid stream into the non-gaseous and gaseous portions.

3. A relief valve according to claim 2, wherein said flow control means comprises a float, said float comprising an upper sealing portion and a central body member, said upper sealing portion including sealing means which are adapted to sealingly engage the valve body when the liquid level in the pressure vessel is above a predetermined maximum, thereby fluidly isolating an interior of the pressure vessel from atmosphere.

4. A relief valve according to claim 3, wherein the valve body includes a body insert, said body insert comprising a cylindrical upper wall and an annular surface, said annular surface defining a circular opening which is sealingly engaged by said upper sealing portion when the liquid level in the pressure vessel is above the predetermined maximum.

5. A relief valve according to claim 4, wherein said cylindrical upper wall and said annular surface cooperate to define an upper chamber, said upper chamber being adapted to receive the non-gaseous portion of the fluid stream.

6. A relief valve according to claim 5, wherein the automatic valve means comprises a poppet valve.

7. A relief valve according to claim further comprising a low pressure adaptor means, said low pressure adaptor means comprising a compression means which is adapted to bias said automatic valve means such that fluid only vents therefrom when a high pressure condition develops within the pressure vessel.

8. A relief valve according to claim 6, further comprising a low pressure adaptor means, said low pressure adaptor means comprising a compression means which is adapted to bias said poppet valve such that fluid only vents therefrom when a high pressure condition develops within the pressure vessel.

9. A relief valve according to claim 8, further comprising a manual bleed valve, said bleed valve being in fluid communication with an interior chamber defined by said valve body and being manually operable to control fluid communication between the interior chamber and atmosphere.

10. A relief valve for a pressure vessel, said pressure vessel being adapted to retain a quantity of liquid therein, said relief valve comprising a valve body which is adapted to mount within a port in the pressure vessel, automatic fluid communication control means, said fluid communication control means being operable to automatically control communication of a fluid stream from the pressure vessel to an upper chamber of the relief valve in accordance with pressure vessel liquid level, and fluid stream separation means, said separation means being adapted to transform the fluid stream from a generally axial flow path into a generally spiral flow path in the upper chamber, centrifugal forces created by the spiral flow path causing the fluid stream to separate into non-gaseous and gaseous components, said non-gaseous components being retained within the upper chamber while the gaseous components are vented to atmosphere via a one-way valve which is mounted to said valve body, wherein said one-way valve allows fluids to flow to atmosphere from said relief valve while preventing oppositely-directed fluid flow.

11. A relief valve according to claim 10, wherein said automatic fluid communication control means permits fluid communication between said pressure vessel and the upper chamber when the liquid level within the pressure vessel is below a predetermined maximum level and prevents fluid communication therebetween when the liquid level within the pressure vessel is above said predetermined maximum level.

12. A relief valve according to claim 11, wherein the automatic fluid communication means comprises a float, said float having a sealing portion which is adapted to seal a circular opening defined by said annular surface when fluid level within the pressure vessel exceeds a predetermined maximum level, thereby preventing fluid communication therethrough.

13. A relief valve according to claim 12, wherein the float includes means to reduce fluid stream volume as the level in the pressure vessel approaches the predetermined maximum level, said means being operable to reduce shock experienced by the pressure vessel and relief valve caused by instantaneously blocking the fluid stream.

14. A relief valve according to claim 13, wherein the means to reduce fluid stream volume includes an upwardly extending projection, said projection extending into the circular opening defined by said annular surface to reduce the fluid stream flow therethrough as the liquid level within the pressure vessel approaches said predetermined maximum level.

15. A relief valve according to claim 14, wherein said valve body comprises a body insert, said body insert including a cylindrical wall and an annular surface which cooperate to define the upper chamber.

16. A relief valve according to claim 15, wherein said one-way valve comprises a poppet valve.

17. A relief valve according to claim 10, further comprising a low pressure adaptor means, said low pressure adaptor means comprising a compression means which is adapted to bias said one-way valve such that fluid only vents therefrom when a high pressure condition develops within the pressure vessel.

18. A relief valve according to claim 14, further comprising a low pressure adaptor means, said low pressure adaptor means comprising a compression means which is adapted to bias said poppet valve such that fluid only vents therefrom when a high pressure condition develops within the pressure vessel.

19. An air relief valve for a pressure vessel, said air relief valve including an integral valve body adapted to mount in a port in the pressure vessel, said valve body defining an interior chamber which is in fluid communication with an interior of the pressure vessel, said air relief valve comprising:

a gas venting valve, said gas venting valve being mounted between said inner chamber and atmosphere and being adapted to allow gases to vent from the pressure vessel to atmosphere while preventing gases from the atmosphere from entering the pressure vessel;

a manual air bleed valve, said bleed valve being in fluid communication with the interior chamber and being operable to control fluid communication of air from atmosphere into the interior chamber;

a body insert, said body insert being received by the inner chamber and including a plurality of downwardly-directed arms, an upper cylindrical wall, and an annular surface, said upper cylindrical wall and said annular surface cooperating to define an upper chamber;

a float, said float being slidably received by said downwardly-directed arms and having an upper sealing portion and a central body member, said central body member being aerodynamically-shaped to facilitate the passage of a fluid stream therearound during filling of the pressure vessel and being adapted to allow communication of the fluid stream between the interior of the pressure vessel and the upper chamber when liquid within the pressure vessel is below a predetermined maximum level and to prevent communication of the fluid stream therebetween when the liquid in the pressure vessel is above said predetermined maximum level, said upper sealing portion being adapted to seal against said body insert when the liquid within the pressure vessel is above the predetermined maximum level, said float including an upwardly extending projection, said projection extending into a circular opening defined by the annular surface to reduce the fluid stream flow therethrough as the liquid level within the pressure vessel approaches said predetermined maximum level, said upwardly extending projection thereby reducing fluid stream volume as the level in the pressure vessel approaches the predetermined maximum level and reducing shock experienced by the pressure vessel and relief valve caused by instantaneously blocking the fluid stream;

a vortex plate, said vortex plate being received by the upper chamber and including a plurality of vanes, said vanes forcing the fluid stream to flow in a spiral path, centrifugal forces created by the spiral flow path separating the fluid stream into a non-gaseous portion and a gaseous portion, said non-gaseous portion being retained within the upper chamber while the gaseous portion is vented to atmosphere via the gas venting valve.

20. An air relief valve according to claim 19, further comprising a low pressure adaptor means, said low pressure adaptor means comprising a compression means which is adapted to bias said gas venting valve such that fluid only vents therefrom when a high pressure condition develops within the pressure vessel.

* * * * *

UNITED STATES PATENT AND TRADEMARK OFFICE
CERTIFICATE OF CORRECTION

PATENT NO. : 5,308,386
DATED : May 3, 1994
INVENTOR(S) : Robert D. Wilkes

It is certified that error appears in the above-identified patent and that said Letters Patent is hereby corrected as shown below:

Column 1, line 52, "Water" should read --water--.

Column 2, line 43, after "a" (first occurrence) insert --top plan--.

Column 6, line 62, "Cap" should read --cap--.

Column 8, line 65, after "claim" insert --1,--.

Signed and Sealed this

Fifteenth Day of November, 1994

Attest:

BRUCE LEHMAN

Attesting Officer

Commissioner of Patents and Trademarks